Sept. 19, 1950           H. R. BUTLER           2,522,857
PRODUCTION OF CREPED FOIL
Filed Nov. 27, 1948
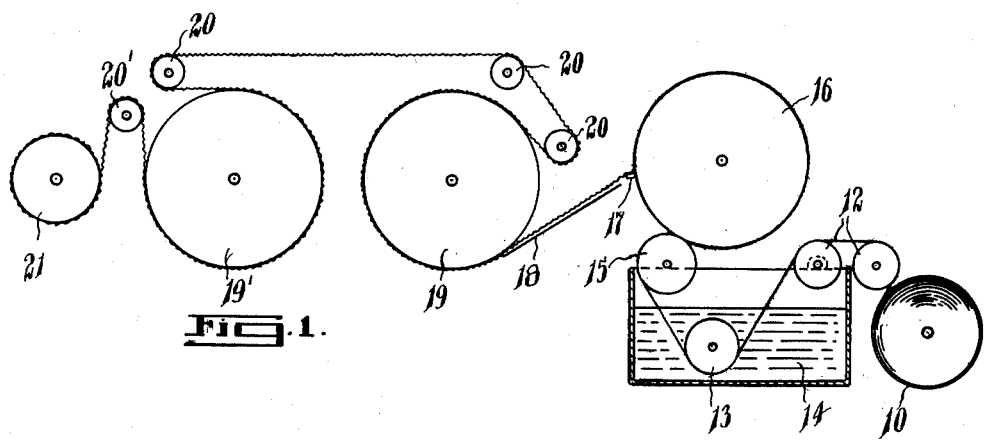
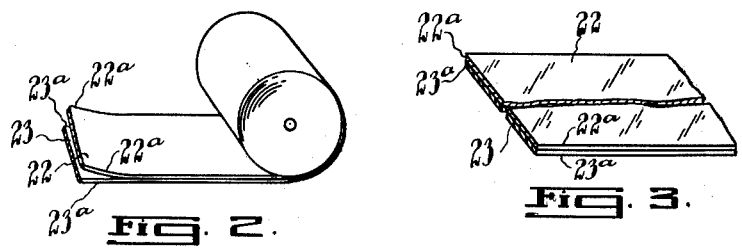
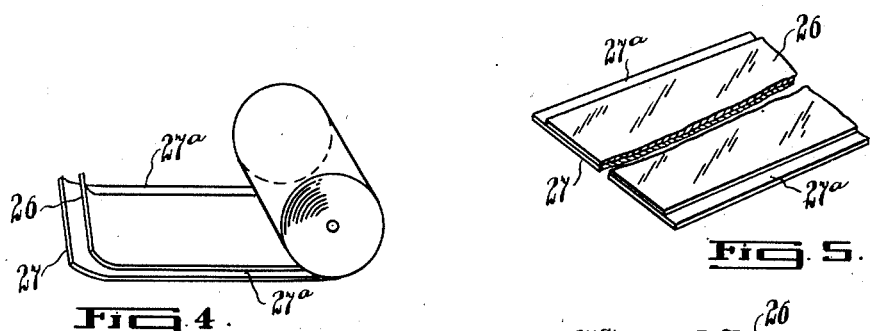
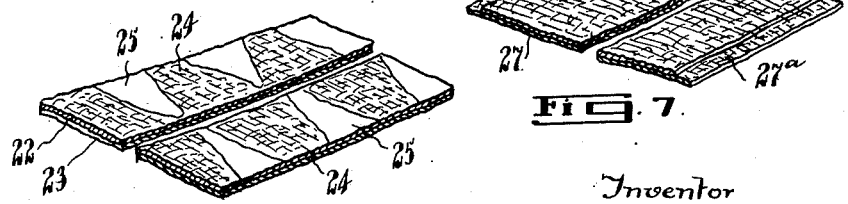
Inventor
Harold R. Butler

UNITED STATES PATENT OFFICE 2,522,857

PRODUCTION OF CREPED FOIL

Harold R. Butler, Toronto, Ontario, Canada

Application November 27, 1948, Serial No. 62,370

5 Claims. (Cl. 154—33.05)

This invention relates to the production of creped foil, and more particularly to the production of creped material composed of a layer of foil laminated to a layer of an absorbent fibrous material such as paper.

While the process of creping paper is a well known art, the production of a creped metallic foil having sufficient elasticity and strength as well as the desirable decorative and functional characteristics of an irregular metallic foil surface has, to my knowledge, never been satisfactorily achieved before. To achieve the required elasticity and strength, it is necessary to laminate the foil to a sheet of paper or like material of the type which is well known to be suitable for creping. I have found that such a laminated foil cannot be successfully creped according to the usual practice in creping paper alone wherein a web of the material is wetted, the excess moisture squeezed out, and the moist material carried over a heated creping roller whereby further moisture is removed by accelerated evaporation and the web creped while still slightly moist under the action of a creping blade adjacent the creping roller.

The difficulty which arises in the production of a creped laminated foil appears to lie in the fact that the impermeable foil surface, and the accompanying bonding adhesive between the layers of foil and paper, interfere with the absorption of water in the wetting operation and with the subsequent elimination of excess water by squeezing and evaporation. The result is that the web of laminated material reaches the creping blade with an excessive amount of water in the central longitudinal area while the edges of the laminated material are excessively dried and do not adhere to the creping roller. The critical requirements for moisture content at the stage of actual creping are not met, and while the creping proceeds to some extent in the central portion of the sheet of laminated sheet material, substantial portions at the edge of the sheet fail to become creped, and the web leaves the creping blade with large wedge-shaped areas extending inward from the edges over which no creping takes place.

I have found that the difficulties arising in the production of creped laminated foil may be avoided by providing marginal longitudinal strips on the sides of the sheet of laminating paper, to which no foil is secured and which are free of the adhesive which is employed to bind the foil to the sheet of paper. There is therefore provided a web of paper of a width determined according to the length of the creping roller, having laminated thereto a central sheet of foil the width of which is less than the width of the paper or the like.

With the arrangement described, a completely satisfactory creped product is produced by wetting the laminated web, removing the excess moisture, and passing the web over a heated creping roller according to the usual practice.

In drawings which illustrate embodiments of the invention and wherein like characters of reference indicate corresponding parts throughout the various views, Fig. 1 is a diagram showing the creping operation;

Fig. 2 is a perspective view of a partially unrolled roll of laminated foil and paper of the usual type and not according to this invention, before creping, with the ends of the laminated layers shown separated;

Fig. 3 is a fragmentary detail perspective view of one corner of the usual type of laminated foil and paper not according to this invention, before creping;

Fig. 4 is a perspective view of a partially unrolled roll of laminated foil and paper prepared for creping according to this invention, with the ends of the laminated layers shown separated;

Fig. 5 is a fragmentary detail perspective view on an enlarged scale of one corner of a sheet of laminated foil and paper prepared for creping according to this invention;

Fig. 6 is a fragmentary detail perspective view on an enlarged scale of a portion of a sheet of laminated foil and paper of the usual type as illustrated in Figs. 2 and 3, after the creping process is completed; and Fig. 7 is a fragmentary detail perspective view of a portion of a sheet of laminated foil and paper prepared according to this invention as illustrated in Figs. 4 and 5, after the creping operation is completed.

The series of operations that characterize the usual mode of creping paper and to which this invention is adapted, is diagrammatically illustrated in Fig. 1. A rolled web of the material to be creped, indicated by the reference numeral 10, and which may be the laminated foil and paper prepared according to this invention, is unrolled over guide rollers 12, 12 and the web is carried under a roller 13 submerged in a bath of boiling or nearly boiling water 14. The web of material 10 is carried from the roller 14 to a nip roller 15, preferably having an outer surface of rubber or similar material, which revolves in close contact with a heated creping roller 16. The web is passed between the nip roller 15 and the creping roller 16 and the excess water is removed therefrom by the pressure of the nip roller 15 against the creping roller. The pressure of the nip roller also causes the moist material to adhere to the surface of the creping roller 16, and the adhesion may be further improved by adding a minute amount of adhesive to the bath 14.

Since the creping drum 16 is heated, preferably by steam, a further amount of excess moisture is removed from the material to be creped by accelerated evaporation. The creping roller 16 is rotated at a predetermined speed and carries the web over the greater portion of its circumference. A creping blade 17 is provided lying across the surface of the creping roller 16 and in close contact therewith. When the web reaches the doctor blade 17, it contains the critical amount of moisture and is properly disengaged from the surface of the creping drum by the edge of the blade.

The creping action is achieved by carrying the web away from the creping drum 16 over a guide plate 18 at a speed preferably not more than two-thirds of the peripheral speed of the creping roller 16. In consequence of the reduced speed of the creped web it is not drawn away from the creping roller 16 as quickly as it is being disengaged therefrom by the creping knife 17 and the crumpling of the surface which is characteristic of creping is thereby produced. Drying rollers 19 and 19' and guide rollers 20, 20, 20 carry the creped material away from the guide plate 18, and it is subsequently carried over guide roller 20' to the finished roll 21.

I have found that laminated material such as shown in Figs. 2 and 3, constituted by a layer of foil 22 secured by a suitable adhesive to a layer of paper, or similar fibrous material suitable for creping, 23, in which the edges 22ª, 22ª of the foil 22 coincide with the edges 23ª, 23ª of the paper 23, will not give satisfactory results when employed for creping according to the process described above. In particular, the presence of an impermeable layer of foil 22 and accompanying adhesive which is required to be waterproof, over the layer of fibrous material 23, has the effect of preventing adequate absorption of moisture during passage of the web through the boiling water bath 13. In consequence the material to be creped does not adhere properly to the creping drum 16, is characterized by an unequal distribution of moisture between the edges and the centre, and reaches the creping doctor blade 17 in a condition unsuitable for satisfactory creping. The effect of employing such laminated material in the creping process is indicated in Fig. 6, which shows the foil surface 22 in creped condition as indicated by reference numeral 24, with large areas of uncreped foil indicated by reference numeral 25 intervening between the creped areas, and particularly at the edges of the web.

According to my invention, the material to be creped is prepared as shown in Figs. 4 and 5. A layer of metallic foil 26 is adhesively secured to the surface of a layer of paper or similar fibrous material 27. The adhesive employed to secure firm adhesion must be completely resistant to moisture and heat, since it is imperative that the adhesion of the layers should not be lessened by the passage of the laminated web through the boiling water bath 13. The width of the foil 26 relative to the width of the paper 27 is adjusted so that marginal strips of paper 27ª, 27ª are left free of adhesive and of foil at each side of the layer of foil 26. The width of the marginal strips 27ª, 27ª is preferably approximately one-half inch but may be considerably wider or slightly narrower without affecting the utility of the invention.

When the web of laminated foil and paper prepared according to this invention is passed through the boiling water bath 13 the marginal strips 27ª, 27ª, being normally water absorptive on both sides of the sheet, take up and retain the same amount of water as the usual web of material for creping would do. The excess moisture is squeezed out by the nip roller 15 from the marginal strips 27ª, 27ª to the same degree as when no foil is used, and the drying action of the heated surface of the creping roller 16 takes place in a normal manner. The proper adhesion of the laminated web to the surface of the creping roller 16 is consequently maintained and the creping proceeds evenly over the whole surface of the laminated material as indicated in Fig. 7. In particular the edges of the web reach the creping blade 17 in a normal condition, such as that pertaining to ordinary creping paper without foil, and there is no tendency to produce uncreped areas on the laminated web at the edges, where the conditions of moisture and adhesion are particularly critical.

It is thought that the construction and use of the invention will be apparent from the above description of the various parts and their purpose. It is to be understood that the form of the invention herewith shown and described is to be taken as a preferred example of the same and that various changes in the shape, size and arrangement of parts may be resorted to, without departing from the spirit of the invention or the scope of the subjoined claims.

What I claim as my invention is:

1. The method of producing creped metallic foil comprising, laminating a sheet of the foil to a wider sheet of cellulosic fibrous material with a heat and moisture resistant adhesive so as to leave strips of uncovered cellulosic fibrous material free of adhesive at both sides of the sheet of foil, and creping the laminated sheets.

2. The method of producing creped metallic foil comprising, laminating a sheet of the foil to a wider sheet of cellulosic fibrous material with a heat and moisture resistant adhesive to form a laminated web having strips of uncovered cellulosic fibrous material free of adhesive at both sides of the sheet of foil, immersing the laminated web in a bath of hot liquid so as to wet the sheet of cellulosic fibrous material and fully saturate the strips of uncovered cellulosic fibrous material, squeezing out excess moisture, applying the sheet of cellulosic fibrous material to a heated creping roller to which the web, including the said strips, adheres, and engaging the web with a creping knife to crepe the web.

3. The method of producing creped metallic foil comprising, laminating a sheet of the foil to a wider sheet of paper suitable for creping with a heat and moisture resistant adhesive to form a laminated web having strips of uncovered paper free of adhesive at both sides of the sheet of foil, immersing the laminated web in a bath of hot water so as to wet the sheet of paper and fully saturate the strips of uncovered paper, squeezing out excess moisture, applying the sheet of paper to a heated creping roller to which the web, including the said strips, adheres, and engaging the web with a creping knife to crepe the web.

4. A creped material comprising a sheet of metallic foil laminated to a wider sheet of cellulosic fibrous material with a heat and moisture resistant adhesive, the cellulosic fibrous material having strips uncovered by foil and free of adhesive at both side edges thereof, the whole of the laminated sheets of foil and cellulosic fibrous material including the uncovered strips of the cellulosic fibrous material being creped.

5. A creped material comprising a sheet of metallic foil laminated to a wider sheet of paper with a heat and moisture resistant adhesive, the paper having strips uncovered by foil and free of adhesive at both side edges thereof, the whole of the laminated sheets of foil and paper including the uncovered strips of the paper being creped.

HAROLD R. BUTLER.

REFERENCES CITED

The following references are of record in the file of this patent:

UNITED STATES PATENTS

| Number | Name | Date |
|---|---|---|
| 1,421,027 | Reynolds | June 27, 1922 |
| 1,534,482 | Angier | Apr. 21, 1925 |
| 2,161,092 | Rowe | June 6, 1939 |

FOREIGN PATENTS

| Number | Country | Date |
|---|---|---|
| 337,716 | Great Britain | Nov. 6, 1930 |